United States Patent [19]

Ryntz

[11] Patent Number: 4,888,399
[45] Date of Patent: Dec. 19, 1989

[54] POLYESTER GRAFT COPOLYMERS, FLEXIBLE COATING COMPOSITIONS COMPRISING SAME AND BRANCHED POLYESTER MACROMERS FOR PREPARING SAME II

[75] Inventor: Rose A. Ryntz, Clinton Township, Lenawee County, Mich.

[73] Assignee: E. I. Du Pont de Nemours and Company, Wilmington, Del.

[21] Appl. No.: 251,741

[22] Filed: Oct. 3, 1988

Related U.S. Application Data

[62] Division of Ser. No. 942,226, Dec. 16, 1986, Pat. No. 4,810,759.

[51] Int. Cl.$^4$ .................. C08G 18/83; C08G 18/68
[52] U.S. Cl. ..................... 525/440; 525/29; 525/445; 528/26
[58] Field of Search ............ 525/440, 29, 445; 528/26

[56] References Cited

U.S. PATENT DOCUMENTS

| | | | |
|---|---|---|---|
| 3,012,987 | 12/1961 | Ansul | 525/440 |
| 3,459,691 | 8/1969 | Ostrowski | 525/29 |
| 3,763,079 | 10/1973 | Fryd | 252/67.54 |
| 3,882,189 | 5/1975 | Hudak | 525/520 |
| 3,954,899 | 5/1976 | Chang et al. | 428/121 |
| 3,962,369 | 6/1976 | Chang et al. | 428/121 |
| 3,962,522 | 6/1976 | Chang et al. | 428/423 |
| 4,017,456 | 4/1977 | Tucker et al. | 428/411 |
| 4,034,017 | 7/1977 | Chang et al. | 525/440 |
| 4,134,873 | 1/1979 | Diaz et al. | 528/73 |
| 4,205,115 | 5/1980 | Piccirilli et al. | 428/334 |
| 4,208,495 | 6/1980 | Chang et al. | 525/440 |
| 4,235,977 | 11/1980 | Frisch et al. | 521/166 |
| 4,420,601 | 12/1983 | Kuroda et al. | 528/76 |
| 4,499,151 | 2/1985 | Dowbenko et al. | 428/447 |
| 4,501,868 | 2/1985 | Bouboulis et al. | 526/208 |
| 4,522,976 | 6/1985 | Grace et al. | 524/722 |
| 4,533,703 | 8/1985 | Kordomenos et al. | 525/440 |

*Primary Examiner*—Patricia Short
*Attorney, Agent, or Firm*—Hilmar L. Fricke

[57] ABSTRACT

Hydroxy functional polyester graft copolymers are provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer has a number average molecular weight between about 1300 and about 15,000, has a hydroxyl number between about 30 and about 300, and is the reaction product of carbon-carbon double bond-reactive monoethylenically unsaturated monomer with hydroxy functional carbon-carbon double bond-bearing branched polyester macromer. The macromer is the reaction product of (i) hydroxy functional polyester reactant containing 0-10 urethane linkages per molecule with (ii) silane compound having the general chemical formula:

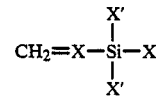

wherein X is an organic group of $(-Si-O-)_n$, n being 1–50, and X' is independently an organic group, hydroxy-reactive functionality, or an organic group comprising hydroxy-reactive functionality, at least one X' comprising hydroxy-reactive functionality.

23 Claims, No Drawings

POLYESTER GRAFT COPOLYMERS, FLEXIBLE COATING COMPOSITIONS COMPRISING SAME AND BRANCHED POLYESTER MACROMERS FOR PREPARING SAME II

This is a division of application Ser. No. 942,226, filed Dec. 12, 1986, now U.S. Pat. No. 4,810,759.

TECHNICAL FIELD

This invention relates to resins and flexible coating compositions comprising same which have excellent adherence to metal and plastic and possess superior weathering properties. More particularly, the invention relates to hydroxy functional polyester graft copolymers and to coating compositions comprising same.

BACKGROUND

Recently, there has been interest in the use of resilient coating materials for areas which are subject to mechanical shock, such as automobile bumpers, moldings and front ends. To maintain the desired appearance for a protective coating on a motor vehicle body panel or like application, any such coating must have certain properties, such as a high degree of extensibility, impact resistance, and resistance to cracking and degradation under severe environmental conditions such as low temperature and high humidity. Conventional coatings, including those heretofore employed on rubber and similar extensible objects, do not have the required combination of properties. Generally, compositions that are flexible enough to be applied over both metal and plastic substrates have rather poor weatherability, appearance, and/or overall durability.

U.S. Pat. No. 3,882,189 and U.S. Pat. No. 3,962,522 are exemplary of numerous patents which describe flexible coating compositions, wherein the resin comprises polyurethane modified polyesters formed by reacting polyisocyanate with polyester polyols. These resins are cured with amine-aldehyde crosslinkers. It is taught therein, that the presence of the urethane groups in the polymer significantly contributes to the flexibility as well as improved weathering properties, gloss, and abrasion resistance of the coating. Such coatings, however, are not of an overall quality to meet certain applications, particularly automotive applications. Accordingly, it is an object of the present invention to provide novel polyester graft copolymers and solvent based, thermosetting coating compositions comprising same, suitable to produce flexible cured coatings with good adhesion over diverse substrates including metal and plastic. In this regard, it is a particular object of the invention to provide such flexible coating compositions at sufficiently low Volatile Organic Content (VOC) to aid in meeting governmental emissions guidelines and yet which can be applied to a substrate by spraying or other known methods. It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, a novel, non-gelled, hydroxy functional polyester graft copolymer is provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer of the invention has a number average molecular weight between about 1300 and about 15,000, has a hydroxyl number between about 30 and about 300, and is the reaction product of carbon-carbon double bond-reactive monoethylenically unsaturated monomer with hydroxy functional carbon-carbon double bond-bearing branched polyester macromer. This reaction is performed under free radical polymerization reaction conditions and the monomer bears substantially no functionality which would be substantially reactive with the hydroxy functionality of the macromer under such reaction conditions. The macromer is the reaction product of (i) hydroxy functional polyester reactant containing 0-10 urethane linkages per molecule with (ii) silane compound having the general chemical formula:

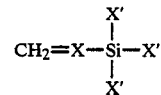

Wherein X is an organic group or (—Si—O—)$_n$, n being 1-50, and X' is (a) an organic group, (b) an organic group comprising hydroxy-reactive functionality, or (c) hydroxy-reactive functionality, at least one X' comprising hydroxy-reactive functionality (i.e., at least one X' being selected from (b) and (c)).

According to the coating composition aspect of the invention, the aforesaid copolymer is employed with polyfunctional, hydroxy-reactive crosslinking agent selected, preferably, from melamine based crosslinking agent, polyisocyanate crosslinking agent, blocked polyisocyanate crosslinking agent, comprising at least two isocyanate groups blocked by reaction with active hydrogen bearing blocking agent, and any compatible mixture thereof.

The coating compositions of the invention can be formulated as either one component coating compositions or two component coating compositions. Typically, unblocked polyisocyanate crosslinking agent is employed in two component compositions in view of its reactivity. A composition of the invention can be formulated, for example, as a one component primer, typically employing blocked polyisocyanate or melamine based crosslinking agent, as a one component topcoat, preferably employing melamine based crosslinking agent, or as a two component coating, typically employing polyisocyanate crosslinking agent. Also, the polyester graft copolymer of the invention can be formulated as a pigmented base coat, typically a one component composition, for a base coat/clear coat system such as are known for use as automotive finishes. It also can be formulated as the clear coat thereof, either as a one component or a two component composition.

Advantageously, the flexible coatings of the invention possess superior weathering properties as well as excellent adhesion to metal and plastic, thus making them well suited for use as coatings on, for example, various motor vehicle components. It is believed that the use of the silicone compound in forming the polyester macromer is, in part, responsible for the excellent weatherability and durability of the coating composition of this invention. Additionally, the use of such silicone compounds contributes to the ability of the coating compositions of this invention to be formulated as high solids compositions. Still further, the ability to use the same coating composition on metal and plastic components in motor vehicle production offers distinct commercial advantages, particularly in terms of production efficiency. Because these coatings can be employed on metal as well as plastic components, the problem of color matching, which must be resolved when using different coatings on metal and plastic parts which are to be in proximity to one another, is eliminated. These and additional features and advantages of the invention will be better understood in view of the following detailed disclosure.

DETAILED DESCRIPTION OF THE INVENTION

The resin of the invention is a novel, hydroxy functional polyester graft copolymer of number average molecular weight ($\overline{M}_n$) between about 1,300 and about 15,000, preferably between about 1,300 and about 4,000, and having a hydroxyl number between about 30 and about 300, preferably between about 50 and about 150. The resin is optionally urethane-modified, more specifically, containing about 0–10 urethane linkages per molecule. Preferably, the resin contains about 0–5 urethane linkages per molecule. As disclosed above, the resin is the reaction product of carbon-carbon double bond-reactive monoethylenically unsaturated monomer with certain hydroxy functional carbon-carbon double bond-bearing branched polyester macromer. Each of these reactants is discussed below in greater detail.

Carbon-Carbon Double Bond-Reactive Monoethylenically Unsaturated Monomer

Numerous carbon-carbon double bond-reactive monoethylenically unsaturated monomers suitable for making the polyester graft copolymer are known to the skilled of the art. Included are many which are commercially available and many which will be readily apparent in view of the present disclosure. The choice of monomer reactant employed in making the polyester graft copolymer will depend to a large extent upon the particular application intended for the resin or for the coating composition in which the resin is to be used. Examples of suitable monoethylenically unsaturated monomers include, for example, vinyl aromatic hydrocarbons such as styrene, alpha methyl styrene, and vinyl toluene, vinyl acetate, vinyl chloride, and the like.

Preferred monomers are acrylate monomers. Numerous acrylate monomers suitable for preparing the hydroxy functional polyester graft copolymer are known to the skilled of the art and include many which are commercially available and which will be readily apparent in view of the present disclosure. As noted above, the choice of monomer reactant employed in preparing the resin of the invention will depend to a large extent upon the particular application intended for the resin or for the composition in which the resin is used. Suitable hydroxy-substituted alkyl(meth)acrylates (where "alkyl(meth)acrylates" means, in the alternative, alkylacrylates and alkylmethacrylates) which can be employed comprise members selected from the group consisting of the following esters of acrylic or methacrylic acid and $C_2$-$C_{12}$ aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl(meth)acrylates including those listed above could be employed, the preferred hydroxy functional monomers for use in the resin of this invention are hydroxy-substituted alkyl acrylates and methacrylates having a total of 5 to 7 carbon atoms, i.e., esters of C2-C3 dihydric alcohols and acrylic or methacrylic acids, such as hydroxyethyl methacrylate, hydroxyethyl acrylate, hydroxypropyl methacrylate and hydroxypropyl acrylate.

Most preferably, the hydroxy-substituted alkyl(meth)acrylate monomer comprises a compound of the formula:

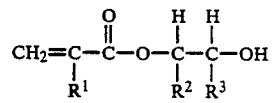

wherein $R^1$ is hydrogen or methyl and $R^2$ and $R^3$ are independently selected from the group consisting of hydrogen and alkyl of from 1 to 6 carbon atoms. Illustrative of these particularly suitable hydroxy-substituted alkyl(meth)acrylate monomers are 2-hydroxyethyl methacrylate, 2-hydroxyethyl acrylate, 2-hydroxypropyl acrylate, 2-hydroxybutyl acrylate and 2-hydroxy-1-methylhexyl acrylate.

Suitable non-hydroxy substituted alkyl(meth)acrylate monomers which may be employed are (meth)acrylates (as before, meaning esters of either acrylic or methacrylic acids) as well as mixtures of acrylates and vinyl hydrocarbons. Preferred non-hydroxy substituted monomers are esters of $C_1$-$C_{12}$ monohydric alcohols and acrylic or methacrylic acids, e.g., methylmethacrylate, ethylacrylate, butylacrylate, butyl-methacrylate, hexylacrylate, 2-ethylhexylacrylate, lauryl-methacrylate, glycidyl methacrylate, and the like.

Particularly preferred non-hydroxy substituted monomers are compounds selected from the group consisting of monomers of the formula:

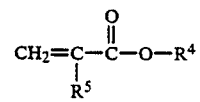

wherein $R^4$ is alkyl of from 1 to 6 carbon atoms and $R^5$ is hydrogen or methyl. Particularly preferred are butyl acrylate, butyl methacrylate and methyl methacrylate.

The aforesaid monovinyl aromatic hydrocarbons, preferably containing from 8 to 12 carbon atoms, including styrene, alpha-methyl styrene, vinyl toluene, t-butyl styrene, chlorostyrene and the like, when employed, will generally be present in an amount of from about 5 to 95 weight percent, preferably from about 5 to 25 weight percent of the total monoethylenically unsaturated monomer.

In addition, other suitable monoethylenically unsaturated monomers such as vinyl chloride, acrylonitrile, methacrylonitrile, vinyl acetate, acrylic acid and methacrylic acid also may be employed. In the case of acrylic acid, when employed, this monomer will generally be present in an amount from about 2 to 5 weight percent of the total monomer mixture. The remaining above-mentioned monomers will generally be used in an amount of from 3 to 10 weight percent of the monomer mixture, when employed.

Hydroxy Functional Carbon-Carbon Double Bond-Bearing Branched Polyester Macromer The hydroxy functional polyester macromer is reacted with the above described monoethylenically unsaturated monomer according to any of various methods well known to the skilled of the art, which methods will be apparent in view of the present disclosure. Specifically, the macromer and the monomer are employed in a weight ratio of from about 90:10 to about 40:60, more preferably from about 75:25 to about 50:50, respectively. Preferably, all double bonds of the macromer are reacted with monomer double bonds. It will be apparent that the resulting resin will be hydroxy functional by virtue of the macromer hydroxyl groups and the monomer hydroxyl groups (if any). Suitable reaction conditions will be apparent to the skilled of the art and, generally, will include a solvent system and reaction temperature favoring free radical polymerization reaction.

The hydroxy functional polyester macromer is the reaction product of any of certain hydroxy functional polyester with any of certain silane compounds. Each of these reactants is discussed below in greater detail.

Hydroxy Functional Polyester

The hydroxy functional polyester has a number average molecular weight ($\overline{M}_n$) preferably between about 1,000 and about 10,000, more preferably between about 1,000 and about 3,000, and has a hydroxyl number preferably between about 30 and about 300, more preferably between about 50 and about 150. As discussed further below, the polyester preferably, but not necessarily, is urethane modified, that is, bears urethane linkages in the polyester backbone. Suitable hydroxy functional polyesters, both urethane modified and unmodified, are known to the skilled of the art and will be apparent in view of the present disclosure. Such compounds can be prepared according to known methods which also will be apparent in view of the present disclosure. The choice of polyester reactant will depend to a large extent upon the particular application intended for the final resin or composition in which such resin is used.

One suitable class of polyester reactants comprises the reaction products of polyol with dicarboxylic acid or an anhydride thereof and most preferably such polyesters are oligomeric polyesters. Preferably, the diacid is selected from the group consisting of saturated and unsaturated, cyclic and acyclic aliphatic dicarboxylic acids, aromatic dicarboxylic acids, and suitable anhydrides thereof. Preferred dicarboxylic acids are the $C_6$–$C_{36}$ acids, which include, for example, adipic, azelaic, sebasic, dodecane dicarboxylic acid, and cyclohexanedicarboxylic acid and dimer acids. More preferably, the dicarboxylic acids employed are aliphatic dicarboxylic acids, most preferably additionally being linear, for example, adipic, azelaic, dimer, and dodecanoic. Also suitable for use as diacid are blocked dicarboxylic acids such as dimethyl-1,4-cyclohexanedicarboxylate. Mixtures of suitable diacids and/or their anhydrides may also be used as the dicarboxylic acid component in this invention.

Numerous suitable polyols for use in making the hydroxy functional polyester are known to the skilled of the art and will be readily apparent in view of the present disclosure. Included are many commercially available polyols and others which are readily prepared according to known methods. Preferably, the polyol comprises diol and triol in hydroxyl equivalent ratio of from about 4:1 to about 1:4, more preferably from about 3:1 to about 3:2.5, respectively. Suitable diols include, but are not limited to, alkylene glycols, such as butylene glycol, neopentyl glycol, 1,5-pentene glycol, 3-cyclohexene-1,1-dimethylol, and other glycols such as hydrogenated bisphenol A, caprolactone diol (e.g., the reaction product of caprolactone and ethylene glycol), hydroxy alkylated bisphenol, polyether glycols, e.g., poly(oxytetramethylene) glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 (trademark; Union Carbide Corp., Danbury, Conn.)

The polyol generally should comprise at least about 5 weight percent triol and may consist substantially entirely of triol. The polyol component also may comprise tetrols and higher functionality polyols, but these generally are less preferred. By employing diols in the polyol component in addition to the triols, the flexibility of the coating composition is generally increased. Thus, selection of the polyol component to be used in forming the polyester compositions will be dependent on the particular desired properties and application of the coating composition. When diols are employed in the polyol component, the polyol preferably comprises from about 10 to about 80 weight percent triols and from about 90 to about 20 weight percent diols. Preferred triols are conventional low molecular triols such as 1,2,6-hexanetriol, 1,1,1-trimethylolpropane, 3-(2-hydroxypropoxy)-1,2-propanediol and polycaprolactone triols, which are commercially available as, for example, Tone-301 (trademark; Union Carbide Corp., Danbury, Conn.). Additional preferred polycaprolatone triols are described in U.S. Pat. No. 4,165,345, incorporated herein by reference. Suitable tetrols will be apparent and include, for example, pentaerythritol and the like.

While a number of types of polyols have been mentioned above as suitable for use in making the hydroxy functional polyester reactant, their disclosure is not meant to be limiting. A great many additional suitable diols, triols, etc. are known in the art and selection of other polyols which would be suitable for use would be well within the skill of those in the art in view of this disclosure.

The polyol reactant (i.e., diols, triols and optionally tetrols, etc.) and diacid reactant are combined and reacted, generally in the presence of a catalyst and at elevated temperatures, to produce the aforesaid hydroxy functional polyester. Suitable catalysts for the carboxy/hydroxy condensation reaction include such catalysts as tetraisopropyl titanate, strong acids such as p-toluene phosphonic acid, phosphoric acid, sulfuric acid and materials such as zinc oxide, antimony oxide (Sb$_2$O$_3$), dibutyl tin oxide, hydrated monobutyl tin oxide, and sodium acetate. Other catalysts will be apparent to those skilled in the art in view of this disclosure. The polyol and dicarboxylic acid are reacted preferably in such proportions as to provide a molar equivalent ratio of OH to COOH from about 6:2 to about 6:5, respectively. Sufficient polyol must be used to provide a hydroxy functional polyester product.

As noted above, the hydroxy functional polyester is optionally urethane modified and typically may contain about 1–10 urethane groups per molecule. According to one embodiment of the invention, urethane groups are introduced by reaction of the above-described hydroxy functional polyester with organic diisocyanate. Such reaction is carried out according to known methods, generally in the presence of solvents commonly employed for coating formulations such as toluene, xylene, methyl amyl ketone, and the like. Numerous suitable organic diisocyanates are readily commercially available and will be apparent to the skilled of the art in view of the present disclosure. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethane diisocyanate. As would be apparent to those skilled in the art, mixtures of various diisocyanates may also be employed as the diisocyanate component used in forming urethane-modified polyester. Typically, the hydroxy functional polyester and diisocyanate are reacted in such proportions as to provide about 4–10 hydroxyl groups per isocyanate group.

While urethane modification may be introduced in the manner discussed above, according to an alternative embodiment of the invention the polyol component employed in reaction with dicarboxylic acid comprises urethane modified polyol. In this case, there is no need to react with diisocyanate the polyester reaction product of polyol and dicarboxylic acid. Employing urethane modified polyol is found to provide a final resin, i.e., a polyester graft copolymer, which is somewhat more flexible than when the urethane groups are introduced by reaction of the polyester with diisocyanate. Suitable urethane modified polyols are commercially available or readily prepared according to known methods. Exemplary urethane modified diols are made by reaction of diol and diisocyanate in a molar ratio of from about 4:1 to about 4:3, preferably from about 2:0.8 to about 2:1.2, more preferably about 2:1. Suitable diols and diisocyanates include those mentioned above. Such ratio of diol to diisocyanate (i.e., a molar excess of diol) causes the reaction product to be substantially free of unreacted isocyanate groups. This urethane modified diol is then combined with other portions of the polyol reactant (e.g., additional diol, triol, tetrol, etc.) and the dicarboxylic acid reactant, generally at elevated temperature and in the presence of a catalyst (as discussed above) to produce the hydroxy functional polyester, specifically, a hydroxy functional urethane modified polyester. It will be apparent to those skilled in the art, that urethane modified triol, urethane modified tetrols, etc. can be used in addition to or in lieu of urethane modified diol, according to the methods and guidelines discussed above, to provide hydroxy functional urethane modified polyester.

Silane Compound

Silane compound reactants suitable for reaction with hydroxy functional polyester in making the polyester macromer of the invention are those according to the general chemical formula:

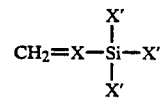

wherein X is an organic group or (—Si—O—)$_n$, n being 1–50, preferably 10–50, and X' is independently (a) an organic group, (b) an organic group comprising hydroxy-reactive functionality or (c) a hydroxy-reactive functionality. At least one X' comprises a hydroxy-reactive functionality, i.e., is selected from (b) and (c), however, each X' may comprise hydroxy-reactive functionality. Exemplary of the organic groups suitable to be employed as X or X' are those selected from, for example, cyclic, acyclic or branched alkyl groups, aryl group and those substituted with non-interfering functionality. Many such organic groups are known and selection of suitable organic groups useful in this invention would be apparent to one skilled in the art in view of the present disclosure. The hydroxy-reactive functionality (i.e., any functionality which would react with a hydroxyl group) of the silane compound, may include such functionality as alkoxy, e.g., OCH$_3$ or OC$_2$H$_5$, halide, e.g., Cl, carboxyl, amino and epoxide. Commercially available silane compounds useful in this invention includes methyltriethoxysilane, methyltrimethoxysilane, vinyltriethoxysilane, vinyltrimethoxysilane, vinyltriacetoxysilane, vinyl-tris-(2-methoxyethyoxysilane), gamma-methacryloxypropyltrimethoxysilane, gamma-methacryloxypropyl-tris-(2-methoxyethoxy)silane, all available from Union Carbide, New York, N.Y., and N-2-(vinylbenzylamino)-ethyl-3-aminopropyltrimethoxysilanemonohydrogen chloride (available from Dow Corning, Midland, Mich.) and the like. Preferably, the silane compound is selected from vinyltriethoxysilane and gamma-methacryloxypropyltrimethoxysilane, or mixtures thereof. The silane compound reactant employed to make the polyester macromers of this invention preferably has a molecular weight of about 100 to about 1000. The choice of silane compound employed in preparing the polyester macromer will depend largely upon the particular application intended for the final resin or for the composition comprising the resin. As will be apparent to one skilled in the art in view of the present disclosure, a compatible mixture of silane compounds may also be employed as the silane compound reactant.

The silane compound and polyester are reacted together according to known methods and reaction conditions. Typically, these two reactants are employed in molar ratio of about 2:1 to about 1:2, more preferably about 1:1. More generally, the silane compound is used in an amount insufficient to yield a gelled reaction product. Also, the silane compound reactant is used in an amount insufficient to react with all of the hydroxy functionality of the polyester, since the reaction product, the branched polyester macromer, must have hydroxy functionality to react with the crosslinking agent during cure. In preparing the macromer a catalyst is generally employed for the reaction between the hydroxy-reactive functionality of the silane compound and the hydroxy functionality of the polyester. The particular catalyst employed for the reaction of the hydroxyl group/hydroxy-reactive functionality would, of course be dependent on the particular hydroxy-reactive functionality of the silane. For example, if the hydroxy-reactive functionality is alkoxy, an acid base catalyst, such as tetraisopropyltitanate may be employed. To catalyze hydroxyl/epoxide reactions, sulfonic acid catalysts are often employed. Suitable catalysts will be apparent in view of the present disclosure. It is also preferred to employ an agent to inhibit polymerization reaction of the carbon-carbon double bonds of the silane compound reactant. Suitable inhibiting agents are well known and include, for example, hydroquinone and others which will be apparent in view of this disclosure.

Coating Compositions

According to another aspect of the invention, the above-described hydroxy functional polyester graft copolymer is employed in an organic solvent based thermosetting coating composition together with suitable polyfunctional hydroxy-reactive crosslinking agent. Such crosslinking agent is selected, preferably, from aminoplast crosslinking agents and polyisocyanate crosslinking agents, either blocked or unblocked depending upon the intended application. Coating compositions of the invention can be formulated so as to be suitable for numerous different applications including, particularly, as motor vehicle body panel coatings. Thus, for example, a coating composition of the invention can be formulated as a primer or as a topcoat, such as a basecoat for a basecoat/clearcoat system, a clearcoat for a basecoat/clearcoat system, or as a one-coating topcoat. Moreover, any of these coatings can be formulated as either a one-component (i.e., resin and crosslinker combined) or a two-component (i.e., resin and crosslinker segregated) coating composition, except that the basecoat of a base/clear system generally would be formulated only as a one-component coating in view of the high pigment content thereof and the mixing and dispersion problems which would result in attempting to add the crosslinking agent at the time of application to a substrate. It is, of course, well known to the skilled of the art to employ unblocked polyisocyanate crosslinking agents generally only in two-component formulations to prevent premature reaction thereof with the hydroxy functional copolymer. Blocked polyisocyanate crosslinkers are employed in one-component coatings, but typically these are employed in primers since the two-component unblocked polyisocyanate coatings of the invention are found generally to provide better surface appearance. The melamine based crosslinking agents also are employed, typically, in one component formulations.

In a coating composition intended for use as a high solids basecoat or clear coat of a base/clear automotive coating formulation, typically it is preferred that the polyester graft copolymer have a number average molecular weight ($\overline{M}_n$) between about 1,500 and about 3,000, more preferably between about 1,500 and about 2,500. Also, for such use the resin preferably has a hydroxy number between about 50 and about 150.

Crosslinking Agent

The crosslinking agent is generally included in compositions of the invention in an amount sufficient to cure the composition. Preferably, the polyisocyanate or blocked polyisocyanate crosslinking agent is included in compositions of the invention in amounts such that, at the cure temperature of the composition, they provide between about 0.5 and about 1.6, more preferably between about 0.5 and about 1.0 reactive isocyanate groups per hydroxyl group present in the hydroxy functional polyester graft copolymer. When melamine based crosslinking agent is employed, it preferably is employed in amounts between about 5% and about 60% by weight of the total weight of resin solids, i.e., the total weight of crosslinkable resins and crosslinker. More preferably, the aminoplast crosslinking agent is employed in an amount between about 20% and about 40% by weight of the total weight of resin solids. Selection of the optimal amount of crosslinking agent to be employed in the coating composition is dependent upon the desired properties (e.g., flexibility) of the coating as well as its intended use (which determines, in part, its desired cure response and desired shelf stability), and selection of such amount would be within the skill of one in the art.

Polyisocyanate crosslinking agents, i.e., isocyanate compounds containing two or more isocyanate groups per molecule, are well known in the art and numerous suitable organic polyisocyanates will be apparent to those skilled in the art. Among the many suitable polyisocyanates are aliphatic, cycloaliphatic and aromatic isocyanate compounds. Representative of the numerous isocyanates which can be employed are (1) aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, 4,4'-bis(isocyanate hexyl) methane, bis(2-isocyanate-ethyl)fumarate, 2,6-diisocyanate methyl caproate, 2,2,4-(2,4,4)-trimethylhexamethylene diisocyanate, and dimer acid diisocyanates; (2) cycloaliphatic diisocyanates such as 1,3-cyclopentane diisocyanate, 1,4-cyclopentane diisocyanate, 1,2-cyclopentane diisocyanate, and methylcyclohexylene diisocyanate; (3) aromatic diisocyanates such as m-phenylene diisocyanate, p-phenylenediisocyanate, 4,4'-diphenyl diisocyanate; (4) aliphatic/aromatic diisocyanates such as 4,4'-diphenylene methane diisocyanates, 2,4- or 2,6-tolylene diisocyanate, 4,4'-toluidene diisocyanate, 1,4-xylylene diisocyanate; (5) nuclear substituted aromatic compounds such as dianisidine diisocyanate, 4,4'-diphenylether diisocyanate, chlorodiphenylene diisocyanate; (6) triisocyanates such as triphenylmethane-4,4',4''-triisocyanate, 1,3,5-triisocyanate benzene, 2,4,6-triisocyanate toluene; (7) tetraisocyanates such as 4,4'-diphenyl dimethylmethane 2,2',5,5'-tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triols, pentaerythritol and the like, as well as monoethers, e.g., diethylene glycol, tripropylene glycol and the like, and polyethers, i.e., alkylene oxide condensates of the above. While the polyisocyanate crosslinking agent may be any organic polyisocyanate as has been noted above, such crosslinking agents for coating composition to be employed as clear (top) coats are preferably aliphatic and cycloaliphatic polyisocyanates, due to their superior weatherability.

Especially preferred for use in clearcoat compositions of the invention are trimerized products of aliphatic diisocyanates such as 1,6-hexamethylene diisocyanate. Still another particularly preferred type of crosslinking agent is a polyisocyanate having a biuret structure. This type of polyisocyanate is well known, as are methods for making the same. Suitable such polyisocyanate crosslinking agents are high molecular weight biurets of 1,6-hexamethylene diisocyanate sold by Mobay Chemical Company under the trademarks Desmodur N and Desmodure L 2291. Exemplary of other biuret type polyisocyanates are those prepared in accordance with U.S. Pat. No. 3,976,622 to Wagner et al.

Blocked polyisocyanate crosslinking agents are well known to the skilled of the art and many suitable for use in compositions of the invention are commercially available or readily prepared and will be apparent from the present disclosure. More specifically, blocked polyisocyanate crosslinking agents comprise the reaction product of a polyisocyanate, such as those mentioned above, with a blocking agent, that is, an active hydrogen-bearing reactant. Exemplary blocked polyisocyanates are described, for example, in U.S. Pat. No. 4,497,938, which description is incorporated herein by reference.

Melamine based crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the melamine based crosslinking agents are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. Particularly preferred crosslinkers are the high solids melamine resins which have substantially 95+ percent nonvolatile content. For so-called "high solids" compositions of this invention, it should be recognized that it is important not to introduce extraneous diluents that lower the final solids content of the coating. Other suitable melamine based crosslinking agents will be apparent to one skilled in the art. Melamine based crosslinking agents are preferred for basecoat compositions of the invention. The melamine based crosslinking agent is generally included in a basecoat composition in an amount of between about 5 and about 60, preferably between about 20 and about 40 weight percent. However, selection of the particular amount of melamine based crosslinking agent to be employed in any such composition is dependent on the desired properties of the composition as well as its intended use and would be apparent to one skilled in the art.

Particularly preferred melamine based crosslinking agents are the amino-aldehyde crosslinking agents sold by American Cyanamid under the trademark "Cymel". In particular, Cymel 301, 303, 1130, 1133, 1156, 1161 and 1168 (trademarks) are alkylated melamine aldehyde resins useful in the compositions of this invention. The crosslinking reactions are catalytically accelerated by acids. One such catalyst, for example, which may be so employed is p-toluene sulfonic acid, which when employed is generally added to the composition in about 0.5% by weight based on the total weight of the polyester graft copolymer and crosslinking agent.

Additional Materials

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (trademark, Spencer-Kellogg, Buffalo, N.Y.). It has been found that these high molecular weight polyurethanes may be employed in metallic flake pigment-bearing topcoat compositions in small amounts, typically up to about 15 weight percent based on the total weight of the polyester graft copolymer and crosslinking agent, to improve the orientation of the metallic flake pigment in the cured coating. It has been found that by including such linear polyurethane, for example, in a basecoat of a basecoat/clearcoat system, the depth of color and metallic glamour of the system may be improved.

Other materials which may be included in the coating compositions of this invention include, for example, catalysts, antioxidants, U.V. absorbers (for topcoats), solvents, surface modifiers and whitening agents. Solvents used in the coating composition of this invention are those which are commonly used, e.g., to facilitate spray application and high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate and mixtures thereof. The solvent in which the polyester graft copolymer is prepared may be employed as a solvent for the composition, thus eliminating the need for drying the resin after preparation, if such is desired.

Typical ultraviolet light stabilizers that are useful in topcoat compositions of this invention are benzophenones such as dodecyl oxibenzophenone, 2,4-dihydroxybenzophenone, hydroxybenzophenones containing sulfonic groups, 2,4-dihydroxy-3',5'-ditertiarybutylbenzophenone, 2,2',4'-trihydroxybenzopherone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2-carboxybenzophenone, triazoles such as 2-phenyl-4-(2'4'-dihydroxybenzolyl)-triazoles, substituted benzotriazoles such as hydroxyphenyltriazoles such as 2-(2'-hydroxy-5'-methylphenyl)benzotriazole, 2-(2'-hydroxyphenyl)-benzotriazole, and 2-(2'-hydroxy-5'-octylphenyl)naphthiotriazole.

Another type of ultraviolet light stabilizer and one that is particularly preferred for use in the coatings of this invention is that taught in U.S. Pat. No. 4,480,084 entitled "Polymeric Light Stabilizers" to Kordomenos et al. These stabilizers contain the sterically hindered polyalkylpiperidine radical and at least two primary hydroxyl groups available for reacting with the crosslinking agent, e.g., melamine based or polyisocyanate, of the coating composition.

Typical antioxidants which may be employed in the coating composition include tetrakis alkylene (di-alkyl hydroxy aryl) alkyl ester alkanes such as tetrakis methylene 3-(3',5'-di-tert-butyl-4'-hydroxyphenyl)propionate methane (available under the trademark Irganox 1010 from Ciba-Geigy Corp.). Also suitable are the reaction product of p-amino diphenylamine and glycidyl methacrylate, the reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilinophenyl)maleimide, alkylhydroxyphenyl groups bonded through carboalkoxy linkages to nitrogen atom of a heterocyclic nucleus containing an imidodicarbonyl group or an imidodithiocarbonyl group, 3,3-ditertbutyl-4-hydroxy-cinnamonitrile, ethyl-3,5-diterthexyl-4-hydroxy-cinnamate, substituted benzyl esters of beta-substituted (hydroxyphenyl)-propionic acids, bis-(hydroxyphenylalkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphinites or phosphinates or phosphionites or phosphorothionates or phosphinothionates, diphenyl-bis(3,5-ditertbutyl-4-hydroxyphenoxy)silane, hydrocarbylhydroxyphenyl-dihydrocarbyldithio-carbamates such as 3,5-ditertbutyl-4-hydroxyphenyl dimethyldithiocarbamate and amino benzyl thioether.

In one preferred embodiment a base/clear topcoat system is provided, wherein both the basecoat and the clearcoat comprise a resin and crosslinker composition according to the invention. The basecoat would preferably contain only a benzotriazole U.V. stabilizer such as Tinuvin 328 (trademark, Ciba-Geigy, Ardsley, NY), and the clearcoat would contain a benzotriazole U.V. stabilizer, e.g., Tinuvin 328, the polymeric hindered amine light stabilizer of the aforementioned U.S. Pat. No. 4,480,084 to Kordomenos et al and an antioxidant, e.g., Irganox-1010 (trademark; Ciba-Geigy). While preferred combinations of stabilizers and antioxidants have been described, these teachings are not meant to be limiting. Selection of suitable stabilizers and antioxidants is within the skill of one in the art.

Surface modifiers or wetting agents are common additives for liquid paint compositions. The exact mode of operation of these surface modifiers is not known, but it is thought that their presence contributes to better adhesion of coating compositions to the surface being coated and helps formation of thin coatings, particularly on metal surfaces. The choice of surface modifiers or wetting agents is dependent upon the type(s) of surface to be coated. Selection of appropriate surface modifiers is well within the skill of the art. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among the many such materials which are known are non-aqueous dispersions (NAD's) such as described by Porter (S. Porter, Jr., and B. N. McBane, U.S. Pat. No. 4,025,474, May 24, 1977).

These particle dispersions may be included generally in an amount up to 15% by weight of the total composition. Other types of NAD's such as described by D. L. Maker and S. C. Peng (U.S. Pat. No. 3,814,721, June 4, 1974) or by S. K. Horvath (U.S. application Ser. No. 292,853, filed Aug. 14, 1981) also may be included in the coating compositions.

Coating compositions according to certain embodiments of the invention may contain pigments. Thus, for example, primer compositions and the basecoat of a base/clear system may comprise any of the wide variety of suitable pigments which are known to the art and readily commercially available. Selection of suitable pigments and the amounts of same will depend largely on the intended use and desired properties of the coating, for example, desired color, hiding properties, etc., and is within the skill of those in the art.

The coating composition can be applied by conventional methods known to those in the art. These methods include roll coating, spray coating, dipping or brushing. The particular application technique chosen will depend upon the particular substrate to be coated and the environment in which the coating operation takes place. Preferred techniques for applying these coating compositions, particularly when applying the same to automobiles, is spray coating through the nozzle of the spray gun. A basecoat, for example, can be applied as a single component by means of a single component spray gun. On the other hand, in spray applying a two component clearcoat composition, the polyester graft copolymer and additives such as pigments, U.V. absorbers, antioxidants and other nonreactive materials are admixed with a solvent. These materials are fed as one component of a two component system into a spray gun which combines the materials as they are sprayed into the automotive substrate. The other material is the polyisocyanate crosslinking agent, which may or may not be cut with a suitable nonreactive solvent.

The invention will be further understood by referring to the following detailed examples. It should be understood that the specific examples are presented by way of illustration and not by way of limitation. Unless otherwise specified, all references to "parts" are intended to mean parts by weight.

EXAMPLE IA

Hydroxy functional polyester was prepared according to this example. Into a suitable reactor were charged 1440 parts Esterdiol-204 (trademark, Union Carbide, Danbury, CT; 2,2-dimethyl-3-hydroxypropyl-2,2-dimethyl-3-hydroxy propionate), 980 parts Tone 301 (trademark, Union Carbide Corp.; polycaprolactone triol), 4 parts Fascat 4100 (trademark, M&T Chemicals, Inc., Rahway, NJ; catalyst), 504 parts adipic acid, and 510 parts phthalic anhydride. The mixture was heated at 300° F. and water was distilled off until the acid number dropped to 7.4. The batch was then cooled and thinned with 1122 parts of xylene.

EXAMPLE IIA

Hydroxy functional carbon-carbon double bond-bearing branched polyester macromer was prepared according to this example. In a suitable reactor were charged 1000 parts of resin from Example IA, 0.08 parts hydroquinone, and 0.8 parts tetraisopropyltitanate. This mixture was heated to 150° F. at which time 70.5 parts gamma-methacryloxypropyl trimethoxysilane was added dropwise over a period of 30 minutes. After addition was complete, the mixture was postreacted at 200° F. until no further methanol was evolved.

EXAMPLE IIIA

Hydroxy functional polyester graft copolymer of the invention was prepared according to this example. Into a suitable reactor were charged 242 parts Exxate 600 (trademark, Exxon Chemical Co., Houston, TX; oxohexylacetate). The solvent was heated to 300° F. at which time a mixture of 960 parts of the resin from Example IIA, 267 parts isobutylmethacrylate, 72.6 parts styrene, 32 parts hydroxyethylacrylate, 24.6 parts acrylic acid, and 47.6 parts Lupersol 533-M75 (trademark, Lucidol Pennwalt Chemical Co., Buffalo, NY; ethyl-3,3-di(t-amylperoxy) butyrate) was added dropwise over a period of 3-4 hours. The mixture was heated for an additional 30 minutes at 320° F. at which time 5.3 parts Lupersol 533-M75 (trademark, Lucidol Pennwalt Chemical Co.) was added. The reaction mixture was post cooked at 320° F. for two hours to yield a resin, when cooled, with a viscosity of $Z_1$ at 73.8% non-volatiles.

EXAMPLE IB

A urethane modified hydroxy functional polyester was prepared according to this example. Into a suitable reactor was charged 2244 parts of the resin from Example IA. This mixture was heated to 220° F. at which time 168 parts Desmodur-W (trademark, Mobay Chemical Co., diisocyanate) was added dropwise over a period of two hours. After addition was complete, the mixture was postreacted at 220° F. until no NCO peak appeared in an infrared spectrum.

EXAMPLE IIB

A hydroxy functional carbon-carbon double bond-bearing branched polyester macromer was prepared according to this example. Into a suitable reactor were charged 525 parts of the resin from Example IB, 0.6 parts hydroquinone, and 0.4 parts tetraisopyopyltitanate. This mixture was heated to 160° F. at which time 35.7 parts N-2-(vinyl-benzylamino)-ethyl-3-aminopropyl trimethoxysilane monohydrogen chloride was added dropwise over a period of 20 minutes. The reaction mixture was postreacted at 170° F. until no further volatile was condensed off.

EXAMPLE IIIB

Hydroxy functional polyester graft copolymer of this invention was prepared according to this example. Into a suitable reactor were charged 110 parts Exxate 600 (trademark, Exxon Chemical Co.) and 19.4 parts cumene hydroperoxide. The solution was heated to 300° F. at which time a mixture of 539 parts of the resin of Example IIB, 145 parts iso-butyl methacrylate, 18 parts hydroxyethylacrylate, 40 parts styrene, 13 parts acrylic acid, and 23 parts t-butylperbenzoate was added dropwise over a period of two hours. The reaction mixture was postreacted at 300° F. for two hours then cooled to afford a resin with a $Z_1$ viscosity at 69.9% non-volatiles.

EXAMPLE IC

A hydroxy functional carbon-carbon double bond-bearing branched polyester macromer was prepared according to this example. Into a suitable reactor were charged 525 parts of the resin from Example IB, 0.2 parts hydroquinone, and 0.4 parts tetraisopropyltitanate. The mixture was heated to 180° F. at which time 35.7 parts vinyltriethoxysilane was added dropwise over a period of 10 minutes. The reaction mixture was postreacted at 210° F. until no further methanol was condensed off.

EXAMPLE IIC

Hydroxy functional polyester graft copolymer of the invention was prepared according to this example. Into a suitable reactor were charged 110 parts Exxate 600 (trademark; Exxon Chemical Co.) and 19.4 parts cumene hydroperoxide. The mixture was heated to 300° F. at which time a mixture of 450 parts of the resin from Example IC, 145 parts iso-butylmethacrylate, 18 parts hydroxyethylacrylate, 40 parts styrene, 13 parts acrylic acid, and 23 parts t-butylperbenzoate was added over a period of 3-4 hours. The reaction mixture was postreacted at 310° F. for 2 hours then cooled to afford a resin with a viscosity of N-O at 52.4% non-volatiles.

EXAMPLE IV

TAUPE MILLBASE FORMULATION

The following materials are charged into a ball mill and ground to form a millbase.

| Charge | Parts |
| --- | --- |
| Resin from Example IIIA | 154 |
| Methyl amyl ketone | 96 |
| Butyl cellosolve acetate | 106 |
| Anti-skinning agent[1] | 2 |
| Barium sulfate | 526 |
| Titanium dioxide | 72 |
| Zinc chromate | 10 |
| Talc #399[2] | 5 |
| Amorphous silica[3] | 23 |
| Black Iron Oxide | 0.5 |
| Polyethylene Wax | 25 |
| Anti-settling and wetting agent[4] | 6.5 |
| Red Iron Oxide | 14 |

[1]Skino #2 available from Mooney Chemical, Cleveland, Ohio
[2]Available from Whittaker, Clark, and Daniels, Willowbrook, Ill.
[3]Imsil A10 available from Illinois Minerals Co., Cairo, Ill.
[4]Anti-Terra-U available from Byk-Gulden Inc., Mellville, N.Y.

EXAMPLE V

White Millbase Formulation

The following materials were charged into a ball mill and ground to form a millbase.

| Composition | Parts |
| --- | --- |
| Butylacetate | 57 |
| ICI 9000[1] | 5.7 |
| EZ-100[2] | 28.5 |
| Xylene | 3986 |
| Butanol | 8087 |
| Cymel 1161[3] | 112 |
| Cymel 1130[4] | 4485 |
| Titanium dioxide | 15991 |
| Resin from Example IIIA | 4144 |

[1]Wetting agent available from ICI Americas Inc., Wilmington, DE.
[2]Quaternary ammonium complex of bentonite clay available from United Catalysts, Inc., Louisville, KY.
[3]Trademark; American Cyanamid; alkylated melamine crosslinking agent.
[4]Trademark; American Cyanamid; alkylated melamine crosslinking agent.

EXAMPLE VI-VIII

Flexible primer compositions according to the present invention are formulated according to the following examples. The coating compositions are applied over Bonderite steel panels and baked at 380° F. for 20 minutes to afford flexible, durable coatingsa with excellent adhesion and hardness.

|  | Examples | | |
|---|---|---|---|
|  | VI | VII | VIII |
| Composition |  | Parts |  |
| Resin from Example IIIA | 1794 |  |  |
| Resin from Example IIIB |  | 1894 |  |
| Resin from Example IIC |  |  | 2526 |
| Millbase of Example IV | 7850 | 7850 | 7850 |
| Cymel 1133[1] | 502 | 502 | 502 |
| Resimene 717[2] | 500 | 500 | 500 |
| Catalyst solution[3] | 246 | 246 | 246 |
| Cargill XP-5770-85[4] | 827 | 827 | 827 |
| K-flex[5] | 462 | 462 | 462 |
| Flow control additive[6] | 248 | 248 | 248 |
| Modarez TMF[7]25 | 17 | 17 | 17 |
| Polybutylacrylate | 100 | 100 | 100 |
| Manganese naphthenate | 30 | 30 | 30 |
| Butanol | 100 | 100 | 100 |

The above compositions are adjusted to 28 sec. #4FC (80° F.) with toluene.

[1]Trademark, American Cyanamid, Wayne, N.J.; alkylated melamine crosslinking agent.
[2]Trademark, Monsanto, St. Louis, MO. partially methylated melamine crosslinking agent.
[3]Acid catalyst solution:

|  | Parts |
|---|---|
| Butyl acetate | 450 |
| Ethanol | 100 |
| VMP naphtha | 256 |
| Methanol | 44 |
| Dionized water | 50 |
| Nacure 2501* | 100 |

*Trademark, King Industries, Norwalk, CT., blocked acid catalyst.
[4]Trademark, Cargill, Minneapolis, MN.; polyester resin.
[5]Trademark, King Industries.; polyester polyol.
[6]Prepared according to U.S. Pat. 4,425,450 Examples 1-3.
[7]Trademark, Synthron, Inc. Morganton, N.C.; flow control additive.

EXAMPLE IX-XI

Flexible enamel compositions according to the present invention were formulated according to the following examples and applied over both metal and plastic substrates and baked at 250° F. for 30 minutes to afford coatings which were flexible and durable.

|  | Example | | |
|---|---|---|---|
|  | IX | X | XI |
| Composition |  | Parts |  |
| Resin from Example IIIA | 123 |  |  |
| Resin from Example IIIB |  | 130 |  |
| Resin from Example IIC |  |  | 173 |
| Para-toluene sulfonic acid solution (40% in butanol) | 4.5 | 4.5 | 4.5 |
| UV absorber solution[1] | 23 | 23 | 23 |
| Polybutylacrylate | 0.9 | 0.9 | 0.9 |
| Acryloid B-82[2] (25% in xylene) | 2.8 | 2.8 | 2.8 |
| White millbase of Example V | 116 | 116 | 116 |
| Cymel 1130[3] | 19 | 19 | 19 |
| Cymel 303[4] | 34 | 34 | 34 |
| Butanol | 13.8 | 13.8 | 13.8 |

The above compositions were adjusted with Exxate 700[5]/butylacetate (40/60 w/w) to 26 sec #4 FC (80° F.)

[1]UV absorber solution:

|  | Parts |
|---|---|
| Butanol | 2305 |
| Tinuvin 440[6] | 500 |
| CGC 1130[7] | 500 |
| Irganox 1010[8] | 55 |

[2]Acrylic polymer available from Rohm and Haas, Philadelphia, PA.
[3]Trademark; American Cyanamid; alkylated melamine crosslinking agent.
[4]Trademark; American Cyanamid; alkylated melamine crosslinking agent.
[5]Trademark; Exxon Chemical Co.; oxoheptyl acetate.
[6]Trademark; Ciba-Geigy; UV absorber
[7]UV absorber available from Ciba-Geigy, Hawthorne, N.Y.
[8]Trademark; Ciba-Geigy; antioxidant.

EXAMPLES XII-XIV

Universal basecoats according to the present invention were formulated according to the following examples.

|  | Example | | |
|---|---|---|---|
|  | XII | XIII | XIV |
| Composition |  | Parts |  |
| Resin from Example IIIA | 946 |  |  |
| Resin from Example IIIB |  | 999 |  |
| Resin from Example IIC |  |  | 1332 |
| Aluminum Stearate | 800 | 800 | 800 |
| Tinuvin 328[1] (30% in xylene) | 400 | 400 | 400 |
| K-flex[2] | 160 | 160 | 160 |
| Flow control additive[3] | 800 | 800 | 800 |
| Butyl cellosolve acetate | 160 | 160 | 160 |
| Para-toluene sulfonic acid (40% in butanol) | 120 | 120 | 120 |
| Cymel 1130[4] | 437 | 437 | 437 |
| Esterdiol solution[5] | 37 | 37 | 37 |
| Cymel 1161[6] | 293 | 293 | 293 |
| Aluminum millbase[7] | 1024 | 1024 | 1024 |

The above compositions were adjusted with methyl amyl ketone to 15 sec #4 FC (80° F.)

[1]Trademark; Ciba-Geigy; U-V absorber.
[2]Trademark; King Industries; polyester polyol.
[3]Microgel prepared according to U.S. Pat. 4,425,450 Examples 1-3.
[4]Trademark; American Cyanamid; alkylated melamine crosslinking agent.
[5]Trademark; Union Carbide, 60% in iso-propanol/xylene (50/50 w/w).
[6]Trademark; American Cyanamid; alkylated melamine crosslinking agent.
[7]Aluminum millbase formulation

|  | Parts |
|---|---|
| Aluminum paste | 3328 |
| Cymel 1161 | 1281 |
| Polyethylene wax | 225 |
| Nuosperse 700* (50% in xylene) | 57 |

*Trademark; Tenneco Chemical,Piscataway, Piscataway N.J. wetting agent.

EXAMPLES XV-XVII

One component universal clearcoats were formulated according to the following examples:

|  | Example | | |
|---|---|---|---|
|  | XV | XVI | XVII |
| Composition |  | Parts |  |
| Resin from Example IIIA | 645 |  |  |
| Resin from Example IIIB |  | 681 |  |
| Resin from Example IIC |  |  | 908 |
| Cymel 1161[1] | 211 | 211 | 211 |
| Polybutylacrylate | 12.1 | 12.1 | 12.1 |
| Para-toluene sulfonic acid (40% in butanol) | 22.8 | 22.8 | 22.8 |
| Acryloid B-82[2] (50% in xylene) | 18.3 | 18.3 | 18.3 |
| EZ-100[3] (5% in xylene) | 9.1 | 9.1 | 9.1 |
| UV absorber solution[4] | 105 | 105 | 105 |
| Methanol | 60.8 | 60.8 | 60.8 |
| Tetralin | 133 | 133 | 133 |

The above compositions were adjusted to 24 sec. #4 FC (80° F.) with butyl acetate/butyl cellosolve acetate -continued (70/30 w/w).

[1] Trademark; American Cyanamid; alkylated melamine crosslinking agent.
[2] Trademark; Rohm and Haas; acrylic polymer.
[3] Trademark; United Catalysts, Inc.; Quaternary ammonium complex of bentonite clay
[4] UV absorber solution:

|  | Parts |
|---|---|
| Butanol | 2305 |
| Tinuvin 440[5] | 500 |
| CGL 1130[6] | 500 |
| Inganox 1010[7] | 55 |

[5] Trademark; Ciba-Geigy; U.V. absorber
[6] Trademark; Ciba-Geigy; UV absorber.
[7] Trademark; Ciba-Geigy; antioxidant.

EXAMPLES XVIII–XXVI

One component basecoat/clearcoat coating systems according to the present invention were prepared according to these examples. Specifically, the one component basecoats and clearcoats identified in Table A were applied, by spraying, wet on wet over both metal and plastic substrates. The coatings were cured at 250° F. for 30 minutes. Film thicknesses ranged from 0.6–0.8 mils for basecoats and 1.8–2.0 mils for clearcoats upon cure. The cured coatings were tested for flexibility, resistance to methyl ethyl ketone (MEK), and resistance to ultra violet light degradation. The test results are shown in Table A.

TABLE A

| Example | Basecoat of Example | Clearcoat of Example | % Elongation | MEK Resistance (10 Double rubs) | QUV (1000 hrs) |
|---|---|---|---|---|---|
| XVIII | XII | XV | 65 | Exc | Exc |
| XIX | XIII | XVI | 70 | Exc | Good |
| XX | XIV | XVII | 65 | Exc | Exc |
| XXI | XII | XVI | 70 | Exc | Good |
| XXII | XIII | XV | 65 | Exc | Good |
| XXIII | XIV | XVI | 70 | Exc | Good |
| XXIV | XII | XVII | 65 | Exc | Exc |
| XXV | XIII | XVII | 65 | Exc | Good |
| XXVI | XIV | XV | 65 | Exc | Exc |

"Exc" means Excellent

EXAMPLES XXVII–XXIX

Two component universal clearcoats are formulated according to the following examples.

| Composition | Example XXVII | XXVIII Parts | XXIX |
|---|---|---|---|
| Resin from Example IIIA | 67.6 | | |
| Resin from Example IIIB | | 71.4 | |
| Resin from Example IIC | | | 95.2 |
| Polybutylacrylate | 1.6 | 1.6 | 1.6 |
| Tetralin | 5.4 | 5.4 | 5.4 |
| UV absorber/stabilizer Pkg[1] | 13.9 | 13.9 | 13.9 |
| Xylene | 30 | 30 | 30 |
| Stannous octoate | 0.4 | 0.4 | 0.4 |
| Flow control additive | 25 | 25 | 25 |
| Desmodur N-3390[3] | 28 | 28 | 28 |

The above compositions are reduced to 22 sec. #4 Ford cup (80° F.) with a blend of Exxate 600[2]/butyl acetate (60/40 w/w).

[1] Solution of: 25 parts Tinuvin 079L[4], 8 parts Tinuvin 900[4], 7 parts Tinuvin 328[4], and 60 parts xylene.
[2] Trademark, Exxon Chemical Co.; oxohexylacetate.
[3] Trademark, Mobay Chemical Co.; polyisocyanate crosslinking agent.
[4] Trademark, Ciba-Geigy; UV absorber.

EXAMPLES XXX–XXXII

One component basecoat/two component clearcoat coating systems according to the present invention are prepared according to these examples. Specifically, the one component basecoats and two component clearcoats identified in Table B are applied, by spraying, wet on wet over both metal and plastic substrates. The coatings are cured at 250° F. for 30 minutes. Film thickness range for basecoats from 0.6–0.8 mils and from 1.8–2.0 mils for clearcoats. The cured coatings are tested for flexibility, resistance to methyl ethyl ketone (MEK), and resistance to ultra violet light degradation. The test results are shown in Table B.

TABLE B

| Example | Basecoat of Example | Clearcoat of Example | % Elongation | MEK Resistance (10 Double rubs) | QUV (1000 hrs) |
|---|---|---|---|---|---|
| XXX | XII | XVIII | 80 | Exc | Exc |
| XXXI | XIII | XIX | 85 | Exc | Exc |
| XXXII | XIV | XX | 80 | Exc | Exc |

"Exc" means Excellent

INDUSTRIAL APPLICABILITY

It will be apparent from the foregoing that this invention has industrial applicability as a protective coating, for example on motor vehicle body panels, and for like applications and provides a flexible, durable coating for metal, plastic and other substrates.

In view of the disclosure, many modifications of this invention will be apparent to those skilled in the art. It is intended that all such modifications which fall within the true scope of this invention be included within the terms of the appended claims.

We claim:

1. Hydroxy functional carbon-carbon double bond bearing branched polyester urethane macromer consisting of the reaction product of reactants consisting of (i) hydroxy functional polyester urethane reactant having about 1–10 urethane groups per molecular with (ii) silane compound having the general chemical formula:

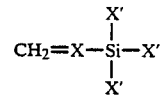

wherein X is an organic group or $(-Si-O-)_n$, being 1–50, and X' is independently (a) an organic group, (b) an organic group comprising hydroxy-reactive functionality or (c) hydroxy-reactive functionality, at least one X' comprising hydroxy-reactive functionality; said polyester urethane consists of the hydroxy terminated esterification product of a polyol and a dicarboxylic acid or anhydride thereof and an organic diisocyanate.

2. The hydroxy functional carbon-carbon double bond-bearing branched polyester urethane macromer of claim 1, wherein said hydroxy functional polyester urethane reactant consists of urethane modified oligomeric polyester having a number average molecular weight between about 1,000 and about 10,000 and a hydroxyl number between about 30 and about 300.

3. The hydroxy functional carbon-carbon double bond-bearing branched polyester urethane macromer of claim 1, wherein said hydroxy-reactive group of said silane compound contains a hydroxy reactive functionality selected from alkoxy, halide, carboxyl, amino and epoxide.

4. The hydroxy functional carbon-carbon double bond branched polyester urethane macromer of claim 1, wherein said organic group of said silane compound is selected from cyclic and acylic, alkyl, and aryl organic groups.

5. The hydroxy functional carbon-carbon double bond branched polyester urethane macromer of claim 1, wherein said silane compound has a molecular weight between about 100 and about 1000.

6. The hydroxy functional carbon-carbon double bond branched polyester urethane macromer of claim 5, wherein said silane compound is selected from the group consisting of gamma-methacryloxypropyl trimethoxysilane, vinyl triethoxysilane and mixture thereof.

7. The hydroxy functional carbon-carbon double bond branched polyester urethane macromer of claim 1, wherein said hydroxy functional polyester urethane and said silane compound are reacted in approximately 1:1 molar ratio.

8. The hydroxy functional carbon-carbon double bond branched polyester urethane macromer of claim 1, wherein said dicarboxylic acid is selected from the group consisting of substantially saturated, acyclic, aliphatic dimer acids of about 6–36 carbons.

9. The hydroxy functional carbon-carbon double bond branched polyester urethane macromer of claim 1, wherein said dicarboxylic acid is selected from the group consisting of adipic acid, azelaic acid, sebasic acid, dodecane dicarboxylic acid, phthalic anhydride and any mixture thereof.

10. The hydroxy functional carbon-carbon double bond branched polyester urethane macromer of claim 1, wherein said polyol comprising diol and triol in hydroxy equivalent ratio of from about 4:1 to about 1:4.

11. The hydroxy functional carbon-carbon double bond branched polyester urethane macromer of claim 10, wherein said triol is selected from the groups consisting of trimethylol propane, polycaprolactone triol, and any mixture thereof.

12. The hydroxy functional carbon-carbon double bond branched polyester urethane macromer of claim 10, wherein said diol is aliphatic diol of the general formula HO - R - OH, wherein R is a divalent, aliphatic, linking moiety substantially unreactive with said dicarboxylic acid.

13. The hydroxy functional carbon-carbon double bond branched polyester urethane macromer of claim 12, wherein said aliphatic diol has a molecular weight of about 60–500 and is selected from the group consisting of trimethylene glycol, triethylene glycol, 1,4-cyclohexane dimethanol, alkyl substituted or unsubstituted propanediol, butanediol, pentanediol and hexanediol, and a mixture of any of them.

14. The hydroxy functional carbon-carbon double bond branched polyester urethane macromer of claim 10, wherein said diol is selected from the group consisting of alkyl glycol of about 2–7 carbons, and any mixture thereof.

15. The hydroxy functional carbon-carbon double bond branched polyester urethane macromer of claim 1, wherein said diisocyanate is selected from the group consisting of phenylene diisocyanate, biphenyl diisocyanate, toluene diisocyanate, isophorone diisocyanate, 3,3'-dimethyl-4,4'-biphenylene diisocyanate, diisocyanatoalkane wherein the alkane moiety has about three to about ten carbons, and a compatible mixture of any of them.

16. The hydroxy functional carbon-carbon double bond branched polyester urethane macromer of claim 1, wherein said hydroxy functional polyester urethane consists of the reaction product of organic diisocyanate with the reaction product of dicarboxylic acid with polyol comprising at least about 5 percent by weight triol, said dicarboxylic acid being selected from the group consisting of saturated and unsaturated, cyclic and acyclic aliphatic dicarboxylic acids, aromatic dicarboxylic acids, suitable anhydrides thereof, and any mixture thereof.

17. The hydroxy functional carbon-carbon double bond branched polyester urethane macromer of claim 16, wherein said hydroxy-reactive functionality of said silane compound is selected from alkoxy, halide, carboxyl, amino and epoxide.

18. The hydroxy functional carbon-carbon double bond branched polyester urethane macromer of claim 16, wherein said dicarboxylic acid is selected from the group consisting of substantially saturated, acyclic, aliphatic dimer acids of about 6–36 carbons.

19. The hydroxy functional carbon-carbon double bond branched polyester urethane macromer of claim 16, wherein said dicarboxylic acid is selected from the group consisting of adipic acid, azelaic acid, sebasic acid, dodecane dicarboxylic acid and any mixture thereof.

20. The hydroxy functional carbon-carbon double bond branched polyester urethane macromer of claim 16, wherein said polyol comprising diol and triol in hydroxy equivalent ratio of from about 4:1 to about 1:4.

21. The hydroxy functional carbon-carbon double bond branched polyester urethane macromer of claim 20, wherein said diol has molecular weight of about 60–500 and is selected from the group consisting of trimethylene glycol, triethylene glycol, 1,4-cyclohexane dimethanol, alkyl substituted or unsubstituted propanediol, butanediol, pentanediol and hexanediol, and a mixture of any of them.

22. The hydroxy functional carbon-carbon double bond branched polyester urethane macromer of claim 20, wherein said triol is selected from the group consisting of trimethylol propane, polycaprolactone triol, and any mixture thereof.

23. The hydroxy functional carbon-carbon double bond branched polyester urethane macromer of claim 16, wherein said diisocyanate is selected from the group consisting of phenyl diisocyanate, biphenyl diisocyanate, toluene diisocyanate, isophorone diisocyanate, 3,3'-dimethyl-4,4'-biphenylene diisocyanate, diisocyanatoalkane wherein the alkane moiety has about three to about ten carbons, and a compatible mixture of any of them.

* * * * *